UNITED STATES PATENT OFFICE.

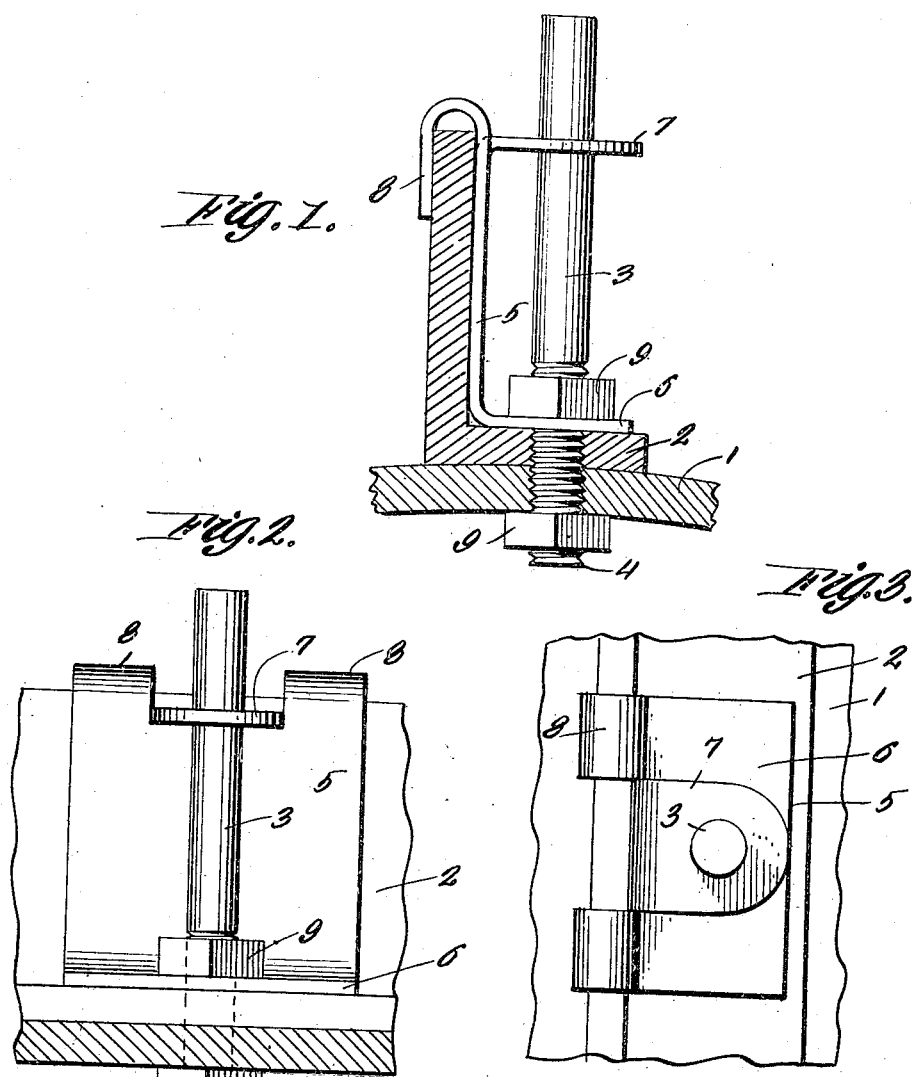

JOSEPH SCHMADEKE, OF BOONE, NEBRASKA.

ICE-LUG FOR TRACTOR-WHEELS.

1,368,762.

Specification of Letters Patent.  Patented Feb. 15, 1921.

Application filed October 28, 1920. Serial No. 420,199.

*To all whom it may concern:*

Be it known that I, JOSEPH SCHMADEKE, a citizen of the United States, residing at Boone, in the county of Boone and State of Nebraska, have invented certain new and useful Improvements in Ice-Lugs for Tractor-Wheels, of which the following is a specification.

This invention relates to ice lugs for tractor wheels and has special reference to a lug designed for attachment to a tractor wheel having diagonally transverse angle bars rigidly fixed to the outer circumferential surface thereof.

The object is to provide a lug that may be quickly applied or removed and one that is durable and efficient in operation.

In the accompanying drawings forming a part of this application and in which like reference characters indicate like parts:—

Figure 1 is a side elevation of the tractor lug showing same attached to a tractor wheel, the tractor wheel and angle bar thereof being shown in section, Fig. 2 is a front elevation thereof, and Fig. 3 is a top plan view thereof.

Referring to the drawings by numerals it will be seen that 1 designates a tractor wheel of conventional construction having the usual diagonally transversely arranged angle bars 2 fixed to the circumferential surface thereof. My lug consists of the bolt 3 having its lower or inner portion threaded as shown at 4. This threaded portion 4 passes through an aperture in the angle bar 2 and an aperture registering therewith in the tractor wheel 1. A brace 5 formed preferably of sheet steel is bent so as to form a foot 6 provided with an aperture for receiving the threaded portion 4 of the bolt and the other end of the brace 5 is provided with spaced apart parallel slits so that the mid portion therebetween may be bent at right angles to the body portion of the brace thus extending parallel with the foot 6. For convenience this mid bent portion will be called an apertured lip 7. The apertured lip 7 receives the shank of the bolt 3 and the bolt extends therebeyond as clearly shown in the drawing for engaging the ice. The side portion of the upper slitted portion of the brace bars are bent in the opposite direction from the apertured lip 7 so as to form hooks 8 which engage the angle bars 2. Nuts 9 are provided on the threaded portion of the bolt 3 and will be screwed together so as to hold the foot 6, angle bar 2, and tractor wheel 1 tightly together. From this construction it will be readily seen that the bolt 3 will be rigidly held in association with the angle bar 2 and the tractor wheel 1 so as to effectively dig into the ice for preventing the slipping of the tractor wheel 1.

The disclosure of my invention shown in this specification and the accompanying drawing refers to the preferred embodiment thereof but I do not wish to be limited to the precise construction disclosed except as so restricted in the accompanying claims.

Having thus described my invention what I claim as new is:—

1. An ice lug for a tractor lug of the class described comprising a body portion, a right angularly extending apertured foot provided at one end of the body portion, a right angularly extending apertured lip provided at the other end of the body portion, and a hook provided at the latter end of the body portion.

2. In combination, a tractor wheel, an angle bar thereon, apertures registering with each other provided in the angle bar and in the tractor wheel, a bolt passing through said apertures, means for holding the bolt in place, an ice lug attachment comprising a body portion, a right angularly extending foot provided at one end of the body portion, a right angularly extending lip provided at the other end of the body portion so as to extend in the same direction with the foot, and a hook formed at this latter end of the body portion so as to extend in the opposite direction from the lip for engaging the angle bar, said bolt adapted to pass through the apertures in the lip and in the foot.

In testimony whereof I affix my signature in presence of two witnesses.

JOSEPH SCHMADEKE.

Witnesses:
 C. E. BARRETT,
 CLARA ANDERSON.